June 21, 1949. C. E. SCHMITZ 2,474,123
RETAINER FOR FLUID SEALS
Filed Aug. 12, 1946

INVENTOR.
Carl E. Schmitz
BY
Charles P. Vajtech
Atty.

Patented June 21, 1949

2,474,123

UNITED STATES PATENT OFFICE 2,474,123

RETAINER FOR FLUID SEALS

Carl E. Schmitz, Chicago, Ill., assignor to Crane Packing Company, Chicago, Ill., a corporation of Illinois Application August 12, 1946, Serial No. 689,854

4 Claims. (Cl. 286—11)

1

This invention relates to fluid seals for rotating shafts and the like and particularly to seals which effect a fluid-tight joint between a stationary housing and a rotating shaft by means of rings or cylinders which have a running fit on a radial plane. For purposes of illustration, this invention will be described with reference to a fluid seal used in the water pump of an internal combustion engine.

In seals for pumps handling fluid at relatively low pressure a flexible sealing means is used which is comprised of a flanged tube made of resilient deformable material such as rubber, either natural or synthetic or a combination of the two. A sealing washer of hard low-friction material bears directly upon a radial face of one of the members to be sealed and the back of the washer abuts on one of the flanges of the sealing member. A spring is interposed between the flanges of the tube to press one flange against one of the relatively rotating members and the other flange against the washer. To relieve the tubular sealing element of driving torque which is created by the relative movement between the washer and the member it bears against, a sliding driving connection is provided between the washer and the first-mentioned relatively rotatable member. In most instances, the driving connection comprises a slot in a casting into which project ears on the washer to prevent relative movement between the washer and the casting. Such casting is generally formed with a cup-shaped hollow in the vicinity of the washer into which the tubular sealing element is inserted.

It has been found that the molding and machining of a cup and driving slots in a casting such as a housing or pump impeller is somewhat costly and that it would be less expensive to use merely a smooth bore within the casting other than an enlarged cup-shaped opening together with the slots and the retaining snap ring normally used with the eared washer to prevent the washer from being pushed too far out of the cup by the spring in the sealing element. The principal object of the invention therefore is to provide a driving and mounting means for a seal of the type described which does not require a deep cup and driving slots molded and machined in a casting and which is substantially self-contained.

A more specific object of this invention is to provide a retainer for a seal which will eliminate the driving ears for the sealing washer and to a large extent the cup into which the seal is placed.

2

Another specific object of this invention is to provide a retainer for a seal which will assist in centering the seal with respect to a shaft or other rotating member.

These and other objects and features of this invention will become apparent from the following detailed description when taken together with the accompanying drawings, in which Fig. 1 is a fragmentary elevation in section of a water pump for an internal combustion engine showing the seal of this invention mounted therein;

Figure 1:
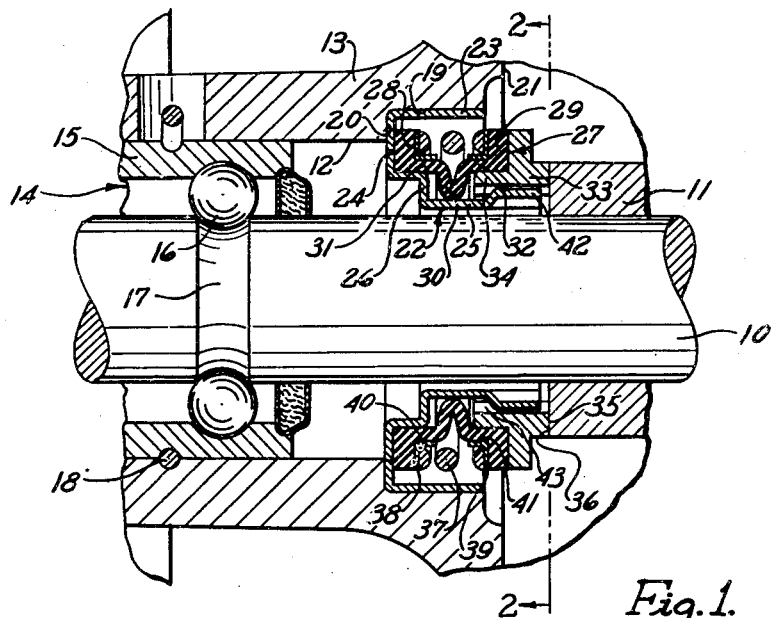

Referring now to the drawings for a detailed description of the invention, and particularly to Fig. 1, there is shown a shaft 10 on which is mounted the hub 11 of a pump impeller (not shown), said shaft passing through an opening 12 in a housing 13. The opening 12 is considerably larger than the diameter of shaft 10 to accommodate a ball bearing 14 comprised of an outer race 15 and a plurality of balls 16 rolling in a groove 17 formed in shaft 10. A snap ring 18 is used to prevent the outer race 15 from moving axially in opening 12 so that shaft 10, through balls 16 and the axially fixed outer race 15, is likewise restrained from moving axially in housing 13.

Opening 12 is enlarged at 19 so that a shoulder 20 is formed at a point removed from the end 21 of housing 13. A retainer 22, preferably made of non-corrodible material such as brass, stainless steel or the like, is positioned within enlarged opening 19 with a fluid-tight fit, the retainer being provided for this purpose with an outer cylindrical wall 23 and a radial wall 24 which abuts shoulder 20 to position retainer 22 with respect to end 21 of housing 13. Retainer 22 is also provided with an inner cylindrical wall 25 which is connected to radial wall 24 by a shoulder or step 26.

Within retainer 22 is a sealing element 27 in the form of a tube and made of resilient deformable material such as rubber, either synthetic or natural or a combination of the two. Said sealing element 27 is provided with end flanges 28 and 29, one or more folds 30 located centrally of the element and cylindrical connecting portions 31 and 32 between the fold and flanges. Shoulder 26 on retainer 22 is so proportioned that cylindrical portion 31 of the sealing element 27 may be slipped over the shoulder to assist in positioning the sealing element within the retainer.

Abutting on flange 29 is a sealing washer 33 which is provided with a shoulder 34 corresponding to shoulder 26 on retainer 22 and fitting snugly within cylindrical portion 32 of sealing element 27.

A suitably finished radial surface 35 is formed on washer 33, said surface 35 cooperating with a similarly suitably finished radial surface 36 on hub 11 to form a fluid-tight running seal between the washer and impeller hub. The washer 33 is held against impeller hub 11 by a spring 37 which is compressed between flanges 28 and 29. Rigid ferrules 38 and 39 are interposed between the ends of the spring 37 and flanges 28 and 29 in order to distribute the spring pressure more evenly about the flanges. The ferrules 38 and 39 are each provided with axially extending portions or flanges 40 and 41, respectively, which serve to stiffen the ferrules and which may also be used to compress the cylindrical portions 31 and 32 of the sealing element upon shoulders 26 and 34 of the retainer and washer, respectively. By thus compressing the sealing element upon the retainer and washer the entire seal may be handled as a unit rather than as a plurality of individual parts which must be assembled in the customer's factory.

Figure 2:
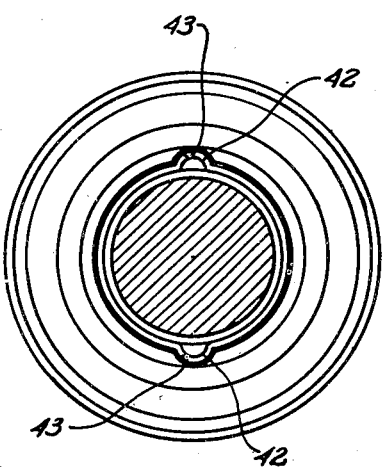
Fig. 2 is a view of the seal taken along line 2—2 of Fig. 1.

The washer 33 is restrained from rotating relative to sealing element 27 by means of two or more driving lugs 42 formed on the inner cylindrical portion 25 of retainer 22. These lugs 42 operate in axial slots 43 formed on the interior surface of washer 33. The axial slots are shown more clearly in Fig. 2. Sufficient clearance is provided between slots 43 and driving lugs 42 to permit free axial movement of washer 33 relative to retainer 22.

The seal of this invention may be assembled at the factory and shipped as a unit to the customer. To assemble the seal ferrules 38 and 39 are placed on the ends of spring 37 and then a sealing element 27 is assembled with respect to the spring and ferrules by pulling one flange through the spring. A washer is then pressed into the cylindrical portion 32 of the sealing element so as to form a tight fit therebetween and the entire sub-assembly thus formed is pressed into retainer 22. This is done by simply locating grooves 43 on washer 33 relative to lugs 42 and then pushing on the washer until there is no further movement of the washer. The pressure exerted upon the washer is transmitted through the spring to flange 28 and the cylindrical portion 31 of the sealing element is compressed between shoulder 26 on retainer 22 and the axially extending portion 40 on ferrule 38. The resulting seal may be handled as a unit and installed by the customer into a housing such as 13 merely by pressing a flat tool against washer 33 and the open end of retainer 22 until radial wall 24 of the retainer strikes shoulder 20 in the housing 13. Alternatively, in order to prevent any damage to the running face 35 of washer 33, the pressing tool can be placed against the open end of outer cylindrical wall 23.

Where there is considerable danger of damage to washer 33 the fit between cylindrical portion 31 of sealing element 27 and shoulder 26 may be made a loose fit so that retainer 22 may be installed in place without the remainder of the seal. In such case, after retainer 22 is installed the remainder of the seal, having been previously assembled as a unit, may then be dropped into place, the only precaution required being that the slots 43 be properly aligned with lugs 42.

It will be apparent that one of the features of this seal is that the radial surface against which flange 28 of the sealing element 27 must abut is furnished by retainer 22 and hence shoulder 20 in housing 13 need not be made very deep. Housing 13 is merely required to have a bore such as 19 which is properly machined to provide a fluid-tight fit with retainer 22 and if this fit is sufficiently tight, shoulder 20 in housing 13 may be dispensed with. It is also apparent that since retainer 22 is located between sealing element 27 and shaft 10 it will act as a shield to prevent the apex of the fold 30 from touching the shaft and possibly becoming worn and ruptured by the friction developed at that point. It will be observed that since washer 33 is relatively wide, it will serve to center flange 29 of sealing element 27 relative to retainer 22.

Figure 3:
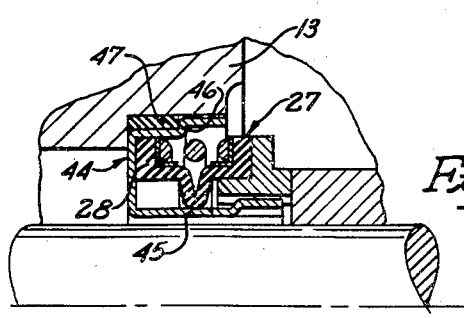
Fig. 3 is a fragmentary elevation in section of a modification of the seal of Fig. 1.

The modification shown in Fig. 3 differs from the form just described mainly in the location of the shoulder in the retainer upon which the flexible sealing element is centered. It will be observed that the retainer 44 has no shoulder adjacent inner cylindrical wall 45 but has a shoulder 46 at its outer periphery. Said shoulder 46 has an inner diameter which is slightly larger than the outside diameter of flange 28 of bellows 27 such that shoulder 46 will serve to center the flexible sealing element in the retainer.

The space formed by shoulder 46 with housing 13 may be used to advantage by filling it with suitable packing material 47 such as rubber, synthetic or natural, fibre, plastic, etc. to form a fluid-tight joint between the retainer 44 and housing 13. The use of packing in this manner renders unnecessary the establishment of a fluid-tight joint between the outer cylindrical wall of retainer 44 and housing 13. Where economy dictates, packing 47 may be omitted and the perfection of the joint between retainer 44 and housing 13 may be relied upon to provide the fluid-tight seal.

The seals above described make possible a simpler machining operation for the housing and particularly for the impeller, since the latter need have only a radial surface against which the sealing washer can run and need not have a cup with slotted periphery as was formerly the case. Another feature is the ease with which a new sealing washer or sealing element or both can be replaced. It is not necessary to remove the retainer when the washer or sealing element is replaced and the retainer may be used indefinitely.

It is understood that the foregoing description is merely illustrative of a preferred embodiment of this invention and that the scope of the invention is not to be limited thereto but is to be determined by the appended claims.

What is claimed is:

1. A seal device for effecting a fluid-tight joint between relatively movable members such as a housing and a shaft passing therethrough, said seal including a sealing washer, a flexible deformable tubular sealing element having flanged ends with cylindrical inner and outer surfaces, said washer bearing against one flange to form a seal thereat, and a spring compressed between the flanges, a retainer for the seal comprising an annular shell open at one side and having cylindrical inner and outer walls and a connecting radial wall, one of said cylindrical walls being pressed against one of the relatively rotatable members so as to be held against rotation with respect to said one member, and a step formed in the outer cylindrical wall of the retainer and fitting closely over the outer cylindrical surface of the flange of the sealing element remote from the washer to center said element relative to the said one member.

2. A seal device for effecting a fluid-tight joint between relatively movable members such as a housing and a shaft passing therethrough, said seal including a sealing washer, a flexible deformable tubular sealing element having flanged ends with cylindrical inner and outer surfaces, said washer bearing against one flange to form a seal thereat, and a spring compressed between the flanges, a retainer for the seal comprising an annular shell open at one side and having cylindrical inner and outer walls and a connecting radial wall, and a step formed in the outer cylindrical wall of the retainer such that a space is formed between the step and the said one member, said step fitting closely the outer cylindrical surface of the sealing element to center said element relative to the said one member and packing compressed in the space to form a fluid-tight seal between the retainer and the said one member.

3. A seal device for effecing a fluid-tight joint between relatively movable members such as a housing and shaft passing therethrough, said seal including a sealing washer, a flexible deformable tubular sealing element having flanged ends with cylindrical inner and outer surfaces, said washer bearing against one flange to form a seal thereat, and a spring compressed between the flanges, a retainer for the seal comprising an annular shell open at one side and having cylindrical inner and outer walls, the outer wall being pressed against one of the relatively rotatable members so as to be held against rotation with respect to the said one member, and a step formed in the inner cylindrical wall of the retainer, the inner cylindrical surface of the flange remote from the washer fitting closely over the said step.

4. A seal device for effecting a fluid-tight joint between relatively movable members such as a housing and a shaft passing therethrough, said seal including a sealing washer, a flexible deformable tubular sealing element having flanged ends with cylindrical inner and outer surfaces and a fold disposed radially inwardly with respect to the said inner cylindrical surfaces of the flanges, said washer bearing against one flange to form a seal thereat, and a spring compressed between the flanges, a retainer for the seal comprising an annular shell open at one side and having cylindrical inner and outer walls, the outer wall being pressed against one of the relatively rotatable members so as to be held against rotation with respect to the said one member, and a step formed in the inner cylindrical wall of the retainer and fitting closely one of the cylindrical surfaces of the sealing element to center said element relative to the said one member, said inner cylindrical wall of the retainer passing between the fold and the other relatively rotatable member to prevent contact between the fold and said other relatively rotatable member.

CARL E. SCHMITZ.

REFERENCES CITED

The following references are of record in the file of this patent:

UNITED STATES PATENTS

| Number | Name | Date |
|---|---|---|
| 2,090,066 | Peterson | Aug. 17, 1937 |
| 2,249,930 | Bailey et al. | July 22, 1941 |
| 2,347,118 | Matter | Apr. 18, 1944 |
| 2,402,995 | Garraway | July 2, 1946 |
| 2,403,298 | Payne | July 2, 1946 |